United States Patent
Karam et al.

(10) Patent No.: US 9,315,417 B2
(45) Date of Patent: Apr. 19, 2016

(54) ATTACHMENT OF A CAP TO A SUBSTRATE-BASED DEVICE WITH IN SITU MONITORING OF BOND QUALITY

(71) Applicants: Raymond Miller Karam, Santa Barbara, CA (US); Georges Roussos, San Jose, CA (US)

(72) Inventors: Raymond Miller Karam, Santa Barbara, CA (US); Georges Roussos, San Jose, CA (US)

(73) Assignee: Invenias Inc, Santa Barbara, CA (US)

( * ) Notice: Subject to any disclaimer, the term of this patent is extended or adjusted under 35 U.S.C. 154(b) by 340 days.

(21) Appl. No.: 13/769,375

(22) Filed: Feb. 17, 2013

(65) Prior Publication Data

US 2014/0230990 A1 Aug. 21, 2014

(51) Int. Cl.
*B32B 41/00* (2006.01)
*C03C 27/00* (2006.01)
*B29L 31/34* (2006.01)
*B29C 65/16* (2006.01)
*B29C 65/00* (2006.01)

(52) U.S. Cl.
CPC ............ *C03C 27/00* (2013.01); *B29C 65/1635* (2013.01); *B29C 66/112* (2013.01); *B29C 66/114* (2013.01); *B29C 66/53461* (2013.01); *B29C 66/7465* (2013.01); *B29C 66/97* (2013.01); *B29L 2031/3481* (2013.01)

(58) Field of Classification Search
CPC ............ B23K 26/032; B29C 65/1638; B29C 65/1654; B29C 65/7847; B29C 66/7465; B32B 2307/412; B32B 2310/0843; B32B 2315/08; B32B 37/06

USPC ............ 156/64, 272.2, 272.8, 285, 350, 363, 156/367, 378, 379, 379.6, 379.8

See application file for complete search history.

(56) References Cited

U.S. PATENT DOCUMENTS

| | | | | |
|---|---|---|---|---|
| 4,400,870 A | * | 8/1983 | Islam | 29/832 |
| 4,852,131 A | * | 7/1989 | Armistead | 378/4 |
| 7,104,129 B2 | * | 9/2006 | Nasiri et al. | 73/514.29 |
| 2006/0032193 A1 | * | 2/2006 | Heerden et al. | 53/485 |
| 2010/0149410 A1 | * | 6/2010 | Matsuzawa | 348/374 |
| 2013/0112650 A1 | | 5/2013 | Karam et al. | |

* cited by examiner

*Primary Examiner* — Michael N Orlando
*Assistant Examiner* — Joshel Rivera
(74) *Attorney, Agent, or Firm* — Shalini Venkatesh

(57) ABSTRACT

Embodiments generally relate to methods for bonding a cap to a substrate. In one embodiment, the method comprises first providing a ring-cap assembly, comprising a cap and an interposer ring comprising a ring material transparent at an illumination wavelength. A peripheral portion of the ring projects outwards beyond the overlying cap. The portion of the ring bottom surface underlying the projecting peripheral portion of the ring comprises a plurality of downwardly extending fingers. The method further comprises positioning the ring-cap assembly so that the plurality of fingers directly overlies predetermined portions of the substrate top substrate, creating a first bond between a first one of the plurality of fingers and a corresponding first predetermined portion of the substrate top surface, while illuminating and observing the first predetermined portion at the illumination wavelength through the projecting peripheral portion of the ring to determine a quality measure of that first bond.

19 Claims, 8 Drawing Sheets

_US 9,315,417 B2_

ATTACHMENT OF A CAP TO A SUBSTRATE-BASED DEVICE WITH IN SITU MONITORING OF BOND QUALITY

BACKGROUND

MEMS and other devices fabricated on wafer substrates are typically bonded to protective covers or caps using techniques such as fusion bonding, anodic bonding or adhesive bonding. In general, the bond is made with the parts to be bonded being held in some type of clamping fixture, sometimes within a vacuum chamber. In situ inspection of the bond formed between the cap and the substrate is problematic, especially in cases where the cap and substrate are formed of materials such as silicon, that are opaque in the visible spectrum. Inspection has to occur after the capped device is removed from the vacuum chamber and/or fixture, and if the bond quality is then found to be poor, the bonding process has to be repeated or the device has to be rejected.

It is therefore desirable to provide a method for bonding a cap to a substrate-based device which allows in situ optical inspection of the bond to be carried out during or immediately after the bonding process. It is also desirable that the method should allow, if an initial bond is observed to be unsatisfactory, for another nearby bond between portions of that same device and cap to be quickly and conveniently formed and inspected in situ.

The established bonding techniques mentioned above have various drawbacks in addition to those related to inspection. Fusion bonding imposes strict requirements on surface flatness and cleanliness over significantly large areas, and involves the application of considerable heat and pressure, often provided by some type of clamp or weight directly contacting the cap and/or the substrate. Such contact may cause damage or even fracture the device cap. Anodic bonding is restricted to a relatively narrow material set, and generally requires high temperatures that may be detrimental to the underlying circuitry, and may increase the probability of thermal expansion mismatch-related bond failure. Achieving bubble-free hermetic bonds with adhesives is very difficult if not impossible. Bubbles increase the probability of bond failure and adhesives do not bond well to hard smooth materials. It is therefore desirable to provide a method that creates a bond over a relatively small bonding surface area, as this reduces the likelihood of the bond being affected by surface contamination and roughness. It is also desirable that the method should avoid imposing direct contact between any clamping or positioning fixture and the top surface or clear aperture of the cap, maintain as much as possible of the cap and substrate at room temperature throughout the bonding process, and avoid the formation of bubbles at the bond site.

SUMMARY

The present invention includes a method for bonding a cap to a substrate. The method comprises first providing a ring-cap assembly, an interposer ring, and a substrate. The cap has a cap top surface and a cap bottom surface, and is characterized by a cap width. The interposer ring comprises a ring material transparent at an illumination wavelength. The ring has a ring top surface and a ring bottom surface, and is characterized by a ring width greater than the cap width, the ring top surface being attached to the cap bottom surface to form the ring-cap assembly such that a peripheral portion of the ring projects outwards beyond the overlying cap. The portion of the ring bottom surface underlying the projecting peripheral portion of the ring comprises a plurality of downwardly extending fingers. The substrate has a substrate top surface. The method further comprises positioning the ring-cap assembly so that the plurality of fingers directly overlies predetermined portions of the substrate top substrate. The method then comprises creating a first bond between a first one of the plurality of fingers and a corresponding first predetermined portion of the substrate top surface while illuminating and observing the first predetermined portion at the illumination wavelength through the projecting peripheral portion of the ring to determine a quality measure of the first bond.

In one aspect, the method additionally comprises, if the determined quality measure of the first bond falls below a desired threshold, creating a second bond between a second one of the plurality of fingers and a corresponding second predetermined portion of the substrate top surface while illuminating and observing the second predetermined portion at the illumination wavelength through the projecting peripheral portion of the ring to determine a quality measure of the second bond.

In another aspect, the observing comprises viewing an optical interference pattern.

DETAILED DESCRIPTION

The manner in which the present invention provides its advantages can be more easily understood with reference to FIGS. 1 through 6.

Figure 1:
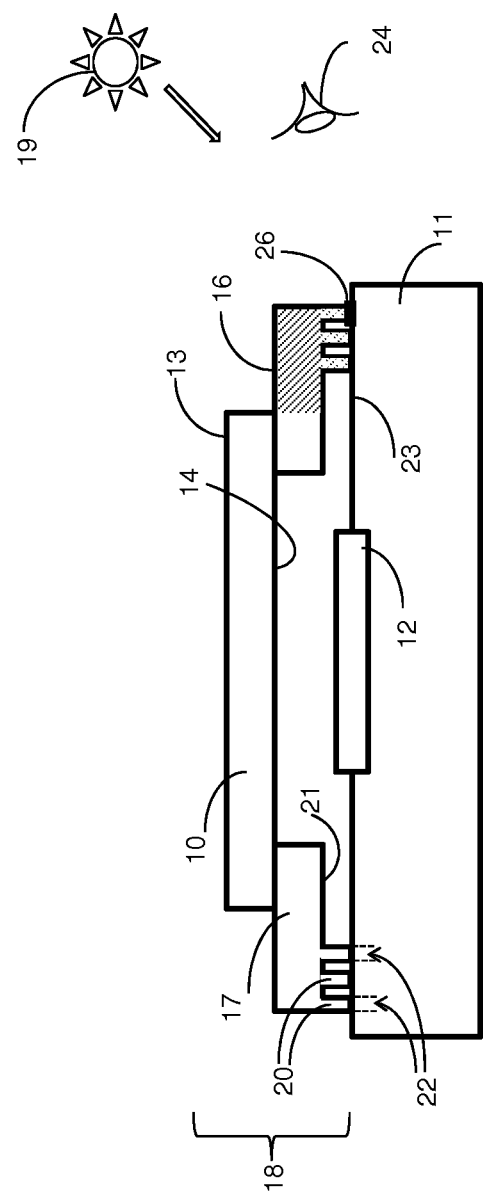
FIG. 1 is a schematic diagram of a cap attached to a substrate-based device according to one embodiment.

FIG. 1 is a schematic drawing showing a cap 10 that has been bonded to a substrate 11 according to one embodiment of the invention. The substrate 11 comprises a device 12 to be covered by cap 10. The cap 10 has a cap top surface 13, a cap bottom surface 14, and is characterized by a cap width 15. The cap bottom surface 14 is attached to the top surface 16 of an interposer ring 17 to form a ring-cap assembly 18. The interposer ring is transparent at the wavelength of an illumination source 19. Peripheral portions of the ring project outwards beyond the overlying cap. One such peripheral portion is shown as a shaded portion of the ring in FIG. 1. A plurality of fingers 20 extends downwards from the bottom surface 21 of the interposer ring in regions underlying those projecting peripheral portions. Predetermined portions 22 of the top surface 23 of the substrate 11 underlie fingers 20 and are visible to an external viewer 24 operating at the wavelength of source 19. A bond 26 is present at the interface between one of the fingers 20 and the corresponding predetermined portion 22.

Figure 2:
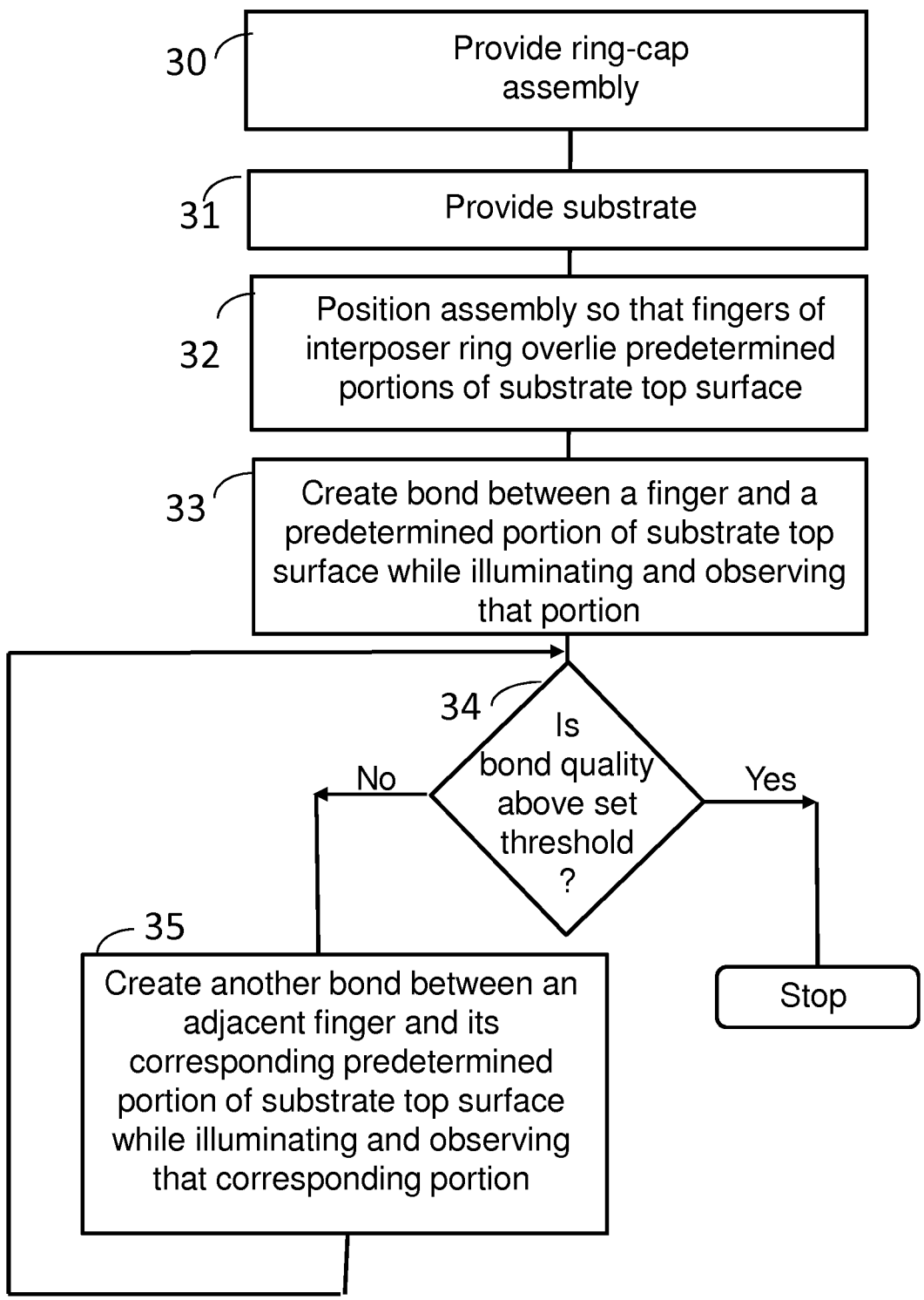
FIG. 2 is a flowchart of process steps for attaching a cap to a substrate-based device according to one embodiment.

FIG. 2 is a flow chart illustrating one embodiment of the invention. At step 30, a ring-cap assembly 18 is provided. At step 31, a substrate 11 comprising a device 12 is provided. The order of steps 30 and 31 may be reversed without detriment to the method. At step 32, the ring-cap assembly 18 is positioned so that the plurality of fingers 20 underlying a projecting peripheral portion of the ring overlies predetermined portions 22 of the substrate top surface 23. At step 33, a first bond 26 is created between a first one of the plurality of fingers and a corresponding first predetermined portion of the substrate top surface. One technique that allows this bond to be advantageously achieved in some embodiments is room temperature laser bonding, which will be discussed in detail below. During step 33, the first predetermined portion of the substrate top surface is illuminated and observed at the illumination wavelength through the projecting peripheral portion of the ring to determine a quality measure of the first bond.

In one embodiment, the observation that determines the bond quality includes an observation of the interference pattern created by reflection of light at the illumination wavelength from the bottom surface of the tip of the finger being bonded and the top surface of the corresponding predetermined portion of the substrate top surface. In cases where the tip of the finger and the substrate top surface are planar, the pattern may take the form of parallel bright and dark lines; in cases where the tip of the finger has a spherical surface, the pattern may take the form of Newton's rings, The presence of dirt or surface roughness may be seen in the form of pattern distortion. If and when a high quality bond is formed, as the sharp material discontinuities causing reflections essentially disappear, so too does the interference pattern.

In the embodiment illustrated in FIG. 2, if a measure of the quality of the first bond is determined at step 34 to fall below a desired threshold—for example, if the interference pattern remains visible over some significant fraction of the "bonded" area, or if pattern symmetry is poor, suggesting localized irregularities—a second bond may be created at step 35 between a second one of the plurality of fingers and a corresponding second predetermined portion of the substrate top surface. As in the case of the first bond, the area being bonded is illuminated and observed at the illumination wavelength through the projecting peripheral portion of the ring to determine a quality measure of the second bond. If necessary, additional fingers may be successively bonded, one by one, to corresponding portions of the substrate top surface until either a satisfactory bond is achieved, or the particular ring-cap assembly and device involved are abandoned. The option of abandonment is not shown explicitly in the figure, but could occur after some predetermined number of repetitions of the loop of steps 34 and 35 has been made.

In one embodiment, the ring material is transparent at a chosen range of illumination wavelengths, and the illuminating and observing is carried out at that chosen range of illumination wavelengths.

Figure 3:
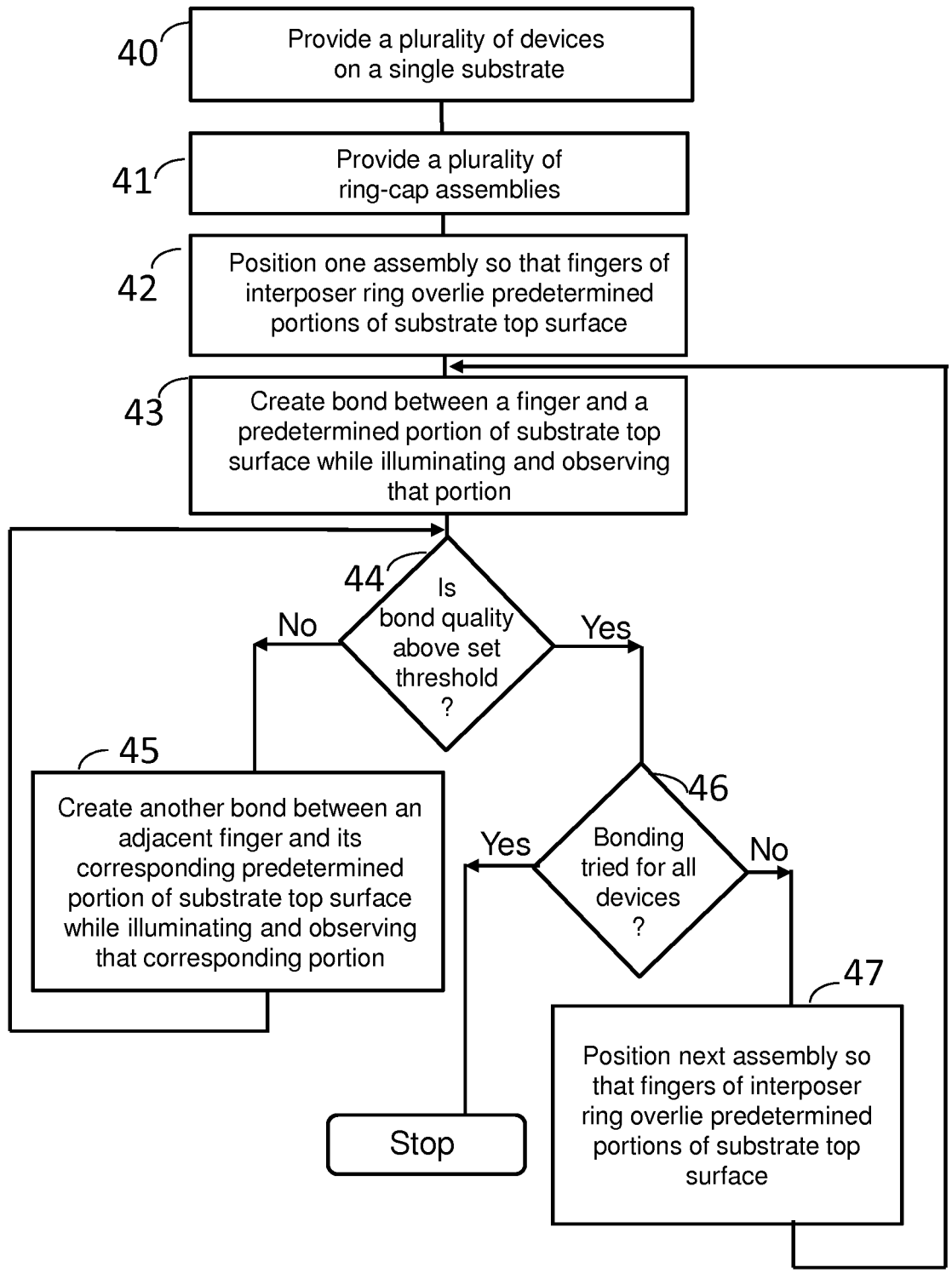
FIG. 3 is a flowchart of process steps for sequential attachment of a plurality of caps to a corresponding plurality of substrate-based devices on a single wafer according to another embodiment.

FIG. 3 is a flow chart illustrating process steps for one embodiment in which a plurality of caps is attached to a corresponding plurality of substrate-based devices on a single wafer, with the attachments being formed sequentially. A plurality of devices 12 formed on a single substrate 11 is provided in step 40, and a corresponding plurality of ring-cap assemblies 18 is provided in step 41. The order of steps 40 and 41 may be reversed without detriment to the method. At step 42, the ring-cap assemblies 18 are positioned so that the plurality of fingers 20 underlying a projecting peripheral portion of each ring overlies predetermined portions 22 of the substrate top surface 23. At step 43, a first bond 26 for a first one of the devices 12 is created between a first one of the plurality of fingers and a corresponding first predetermined portion of the substrate top surface. As mentioned above, and discussed below in some detail, room temperature laser bonding is one particularly advantageous technique for creating such a bond, During step 43, the first predetermined portion is illuminated and observed at the illumination wavelength through the projecting peripheral portion of the ring to determine a quality measure of the first bond. If the quality measure is determined at step 44 to be unacceptable, a second bond may be created and observed at step 45. If necessary, additional fingers may be successively bonded, one by one, to corresponding portions of the substrate top surface until either a satisfactory bond is achieved, or the particular ring-cap assembly and device involved are abandoned.

At step 46 it is determined whether bonding attempts have been made for all of the plurality of devices as desired. If they have not, the next ring-cap assembly is positioned appropriately with respect to the next device, as indicated in step 47. The process then returns to step 43 for a bond to be created for the next device, with illumination and observation to determine a quality measure of the bond, as was done for the previous device. Successive bonds are made for successive devices in this way until all the devices on the substrate have been either satisfactorily capped or abandoned.

Figure 4:
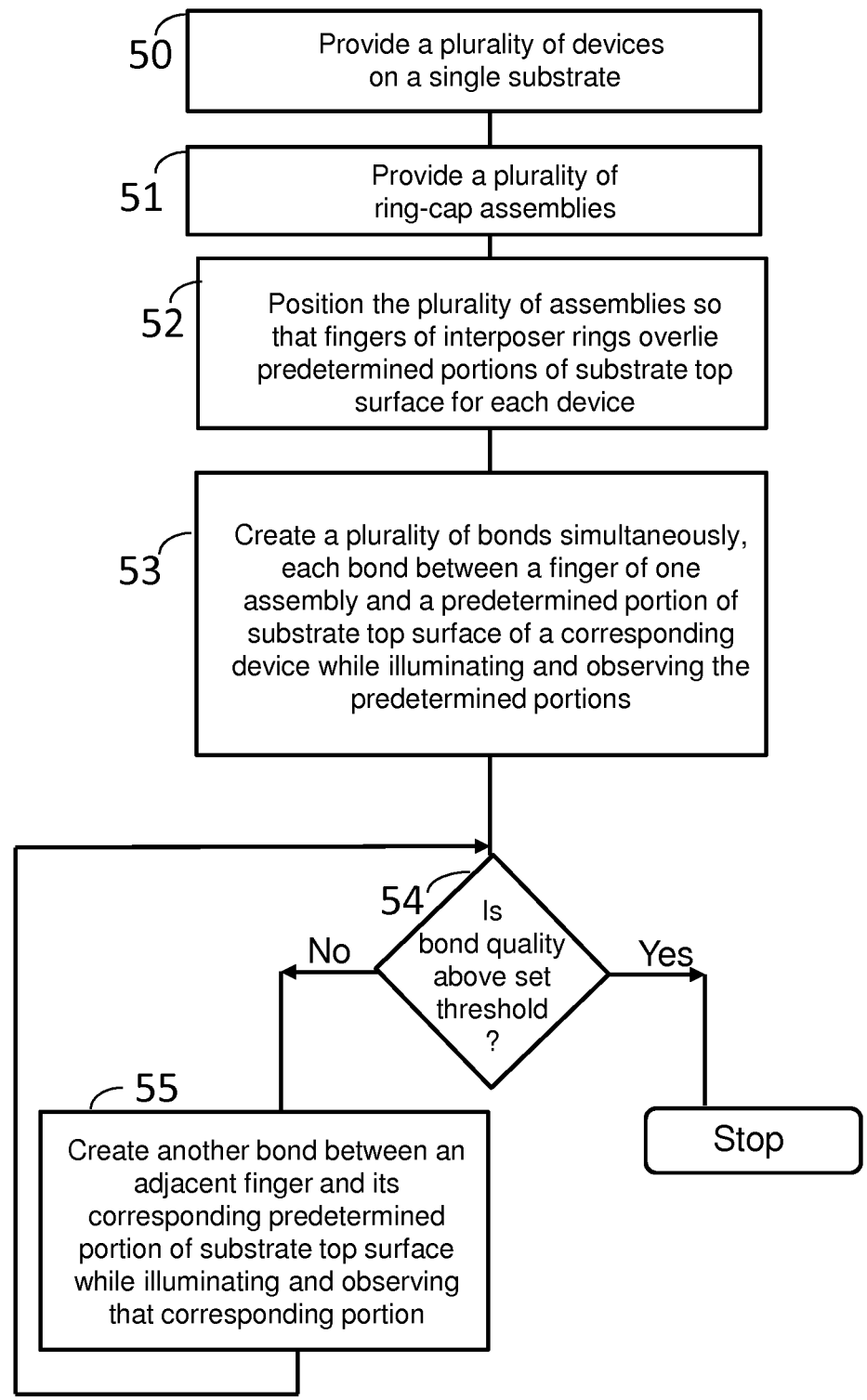
FIG. 4 is a flowchart of process steps for simultaneous attachment of a plurality of caps to a corresponding plurality of substrate-based devices on a single wafer according to another embodiment.

FIG. 4 illustrates process steps for an alternative embodiment for attaching a plurality of devices 12 formed on a single substrate 11 to a corresponding plurality of ring-cap assemblies, Steps 50 and 51 correspond to steps 40 and 41 discussed above. At step 53, a first series of bonds is created, so that each of the plurality of devices is bonded to corresponding predetermined portions of the substrate top surface substantially simultaneously, rather than sequentially as in the case of FIG. 3. During step 53, the series of first predetermined portions is illuminated and observed at the illumination wavelength through the projecting peripheral portion of the ring to determine a quality measure of the series of first bonds. If the quality measure for any of these bonds is determined at step 54 to be unacceptable, corresponding second bonds may be created at step 55 and observed in the same way. If necessary, additional fingers may be successively bonded, one by one, to corresponding portions of the substrate top surface until either a satisfactory bond is achieved, or the particular ring-cap assembly or assemblies and device or devices involved are abandoned.

Figure 5:
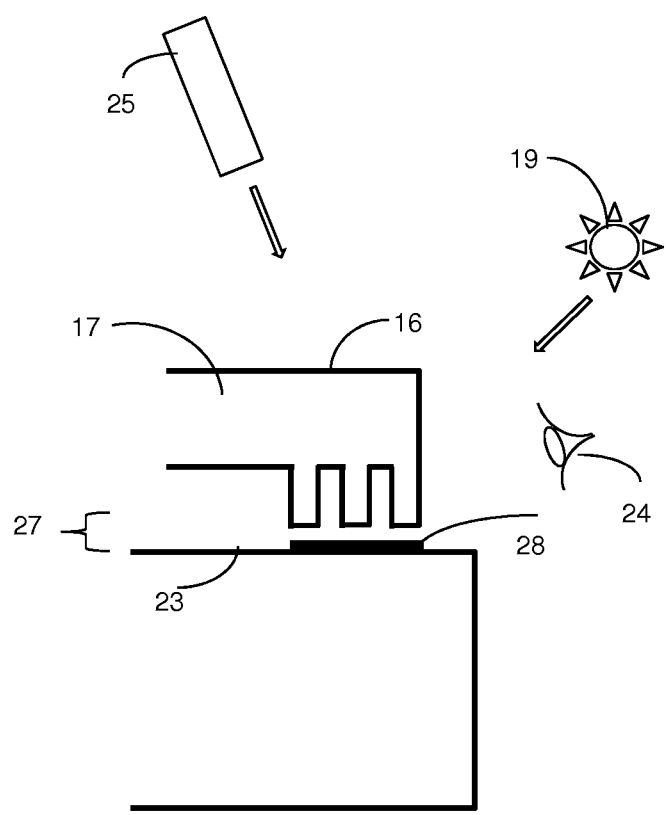
FIG. 5 is a schematic diagram illustrating how room temperature laser bonding may be employed during the attachment of a cap to a substrate based device according to one embodiment.

As noted above, room temperature laser bonding is one particularly advantageous choice for forming the bond between the device and the ring-cap assembly. In brief, the technique provides higher bond yields with lower demands on surface smoothness and cleanliness. FIG. 5 illustrates how room temperature laser bonding may be carried out in the context of the embodiment of FIG. 1, FIG. 5 showing an exploded view of part of the FIG. 1 embodiment just before layer 28 is placed in contact with the tips of the fingers of ring 17, as will be described below in the discussion of FIG. 6. A laser 25 provides a beam at a wavelength for which at least one of the ring material and the substrate material is transparent. In the embodiment of FIG. 5, with laser 25 positioned above the ring, the ring material is assumed to be transparent.

If the substrate 11 is transparent, an alternative arrangement would be to have laser 25A positioned beneath the substrate, as indicated by elements in dashed outlines in FIG. 5.

An interface 27 between the layers provides a change in the index of transmission or optical transmissivity which results in absorption of laser energy at the interface and localized heating to create a bond 26. In the shown embodiment, an absorption layer 28, which is opaque or blocking to the laser wavelength and has an affinity for diffusion into the substrate and the ring material, is deposited on the substrate top surface 23. In another embodiment, not shown, the absorption layer may be deposited on the tips of the fingers 20. Both of the preceding embodiments are particularly useful in cases where both the ring material and the substrate top surface are transparent at the laser wavelength. In embodiments where the ring material is glass and the substrate top surface is a glass or oxide or nitride layer, the absorption layer may be a metal, semiconductor or ceramic material. However, in alternative embodiments other materials having appropriate wavelength absorption and diffusion affinity characteristics may be employed. The thickness of the absorption layer may be as thin as 10 Å and as thick as desired to compensate for surface roughness. Layer thickness may also be relevant to the control of the laser bonding process when self-regulation, as discussed below, cannot be assumed. An example of a typical absorption layer would be 100 nm of Cr deposited on a surface smooth to 4 Å Ra.

The desired change in transmissivity at the interface can also be accomplished through the use of an opaque (low transmissivity) substrate top surface at the laser wavelength, or a liquid film having a mismatched index of transmission from the ring and/or substrate top surface.

Figure 6:
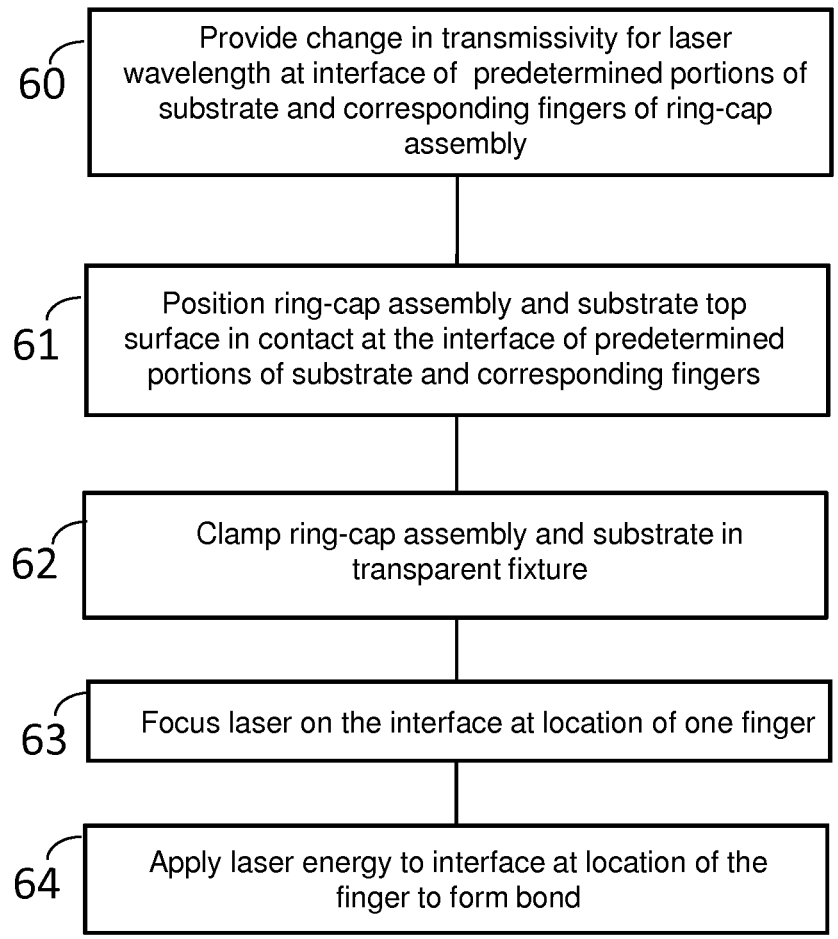
FIG. 6 is a flowchart showing process steps for room temperature laser bonding—one part of a process for attaching a cap to a substrate based device according to one embodiment.

FIG. 6 illustrates the process steps that accomplish bonding in some embodiments that use room temperature laser bonding, with reference to the elements disclosed in FIGS. 1 and 2. In the example illustrated in FIG. 5, the ring material comprises glass of any type generally transparent to the wavelength of the laser 25. At step 60, a change in transmissivity is created at the interface 27 of predetermined portions of substrate and corresponding fingers of the ring-cap assembly. In the shown embodiment, this is achieved by applying an absorption layer 28 to the substrate top surface 23, although in other cases layer 28 may be applied to the tips of the plurality of fingers 20. The absorption layer may be continuous over the substrate top surface or patterned. In the latter case, the patterning may limit the layer to the predetermined portions at which bonding is desired. Alternately, the patterning may be carried out simply to avoid particular features of the device 12 such as microfluidic channels. At step 61, the ring-cap assembly and the substrate top surface are placed in contact with each other at the interface. The surfaces may or may not be extremely well polished. The thickness of the absorption layer can be thickened to compensate for surface roughness. At step 62, the ring-cap assembly and the substrate are clamped in a fixture that is transparent to the wavelength of laser energy being used. At step 63, the laser is roughly focused on the interface 27 at the location of the first one of the plurality of fingers 20 and the corresponding underlying first predetermined portion 22 of the substrate top surface 23 in the fixture. At step 64 the laser energy is applied to the interface 27, either through the ring-cap assembly, assuming the ring material is transparent at the laser wavelength, or through the substrate, assuming the substrate material is transparent at the laser wavelength. If both the ring-cap assembly and the substrate are transparent at the laser wavelength, either arrangement may be used.

The application of laser energy at step 64 has a series of effects. First, the temperature of the absorption layer 28 at the location of the first finger rises. Next, the glass of the ring-cap assembly in close proximity to that location softens, and the substrate top surface, typically comprising a layer of glass or oxide or nitride, in close proximity to that location softens. Then, the absorption layer, which has continued to absorb the laser energy, forms a plasma, and the temperature of the absorption layer is raised to a diffusion temperature. Next, the absorption layer diffuses into the softened materials above and below it and the interface 27 at that location becomes transparent to the laser energy, so absorption ceases and the plasma collapses. Finally, the softened materials of the ring and the substrate top surface fuse together into a permanent bond 26. It is important to note that the absorption layer should diffuse at temperature that is higher than the first transition temperature of the glass ring to ensure that the glass becomes soft and bonds to the neighboring substrate glass (or oxide or nitride). This approach makes the most robust, least particulate sensitive bond.

In this example, the entire process takes place such that almost the entire bulk of the ring and the substrate, including the device to be capped, remains at room temperature and only the absorption layer and the ring and substrate materials immediately adjacent the bond-line itself are elevated to a temperature where the absorption layer is diffused into the surrounding materials by absorbing the laser radiation. The width of a single bond-line can vary from approximately 0.001 μm to 100 μm or greater and the depth of the bond-line is nominally 500 nm into each component of the structure. However, it can vary from a fraction of a micro-meter to multiple micro-meters.

The room temperature laser bonding process takes advantage of the affinity of metals, ceramics and semiconductors to diffuse into glass at elevated temperatures making the bond-line virtually transparent both in the visible spectrum and to the laser radiation wavelength. Therefore, in embodiments where the ring material and the substrate material in the path of the laser are substantially transparent, the process is self-regulating. When the absorption layer has fully diffused into the surrounding materials, the laser energy passes through the ring and substrate with no further heating and the reaction stops. Therefore, the device on the substrate is never ablated or over-heated by the laser.

The transparency of the material through which the laser passes before reaching the interface 27 should be at least 70 percent at the wavelength at the laser energy. Otherwise, the reduced power penetration to the depth of the absorption layer may result in insufficient diffusion of the layer and thus an incomplete bond or no bond at all. Also, if too much laser radiation is absorbed prior to reaching that layer, the intervening material may be damaged.

The wavelength of the light from illumination source 19 will typically be different from the wavelength of laser 25.

Room temperature laser bonding may be used in batch processing embodiments that perform multi-device bonding, such as those discussed above with reference to FIGS. 3 and 4. In the case of sequential multi-device bonding (FIG. 3), the laser energy is first applied to the interface 27 for one device, and then, after either satisfactory bonding or abandonment of that device, is applied to the interface 26 for another device, and so on. Typically, a scan pattern such as a raster scan may be followed. In the case of simultaneous multi-device bonding, the output beam from laser 25 may be split into multiple beams, each of which is directed to be applied to a different device. For this latter case, observation and determination of satisfactory bonding may be carried out either in parallel, substantially simultaneously for all devices, or sequentially, for one device after another after bonding has been attempted for multiple devices. A single laser may be employed even when multiple devices are to be capped simultaneously, by employing beam splitters and a plurality of focusing optical trains.

Traditional bonding processes typically occur at elevated temperatures, where differences in thermal coefficients of expansion (TCE) may generate severe structural distortion and even device failure when the bonded assembly cools down. However, with the laser bonding process disclosed herein, only a highly localized temperature change occurs, so the bulk temperature of the materials being bonded can be maintained at the temperature at which the capped device is to be used, rather than being raised to hundreds of degrees above that level. The disclosed laser bonding therefore allows the bonding of materials of significantly different TCE while avoiding the risks of subsequent structural distortion and device failure.

Room temperature laser bonding may be used to bond two materials of high transmissivity as described above, or to bond a material of high transmissivity, such as glass, to materials of significantly different transmissivity, such as silicon, ceramics or metals. A deposited layer of absorbing material may be used just as before to create an absorption layer. However, in this case, after the layer diffuses into the glass, the process will not be self-regulating, and very careful control of laser power is required such that the surface of the low transmissivity substrate does not get ablated. Specifically, the laser fluence is controlled such that the surface of the low transmissivity substrate at the interface is heated to well beyond the first transition temperature of the overlying glass for a very short time. In this way, the glass softens under the laser radiation being absorbed by the surface of the low transmissivity substrate, and then, during the cooling process, silicon dioxide bonds will form at the interface and adhere each of the components to each other. This process works well for glass to silicon, glass to ceramics, glass to metals and glass to plastics bonding.

An additional advantage of the room-temperature laser bonding process described herein is the ability to form conductive leads into the same interface layer that is being bonded. The structure of the leads may be formed by the laser track on the workpiece at the time of bonding. Therefore, it is not necessary to pattern the bonding layer to create a contact lead structure, which provides the additional "green" advantage of avoiding the deposition and etching processes required by alternative methods of lead formation.

Figure 7:
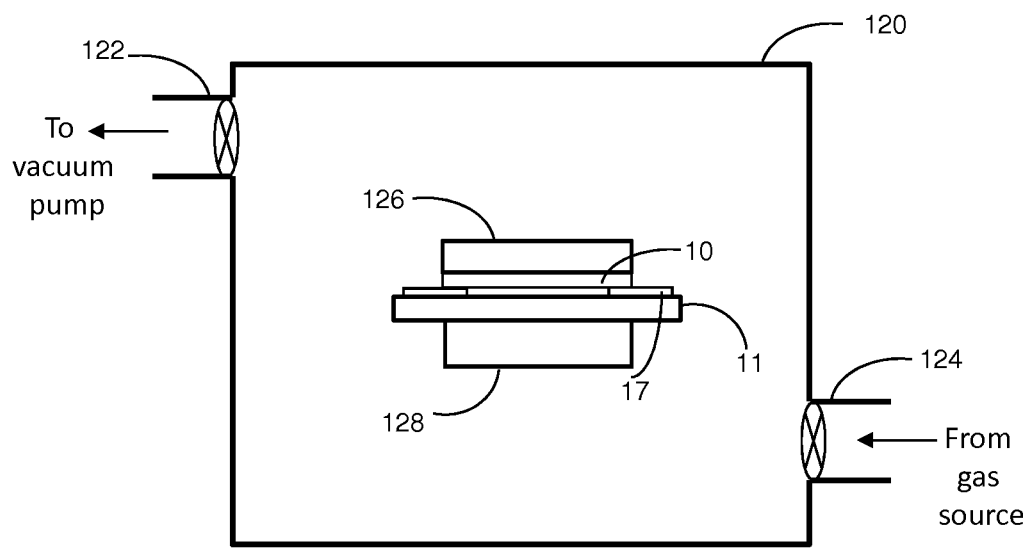
FIG. 7 is a schematic diagram illustrating one stage in the attachment of a cap to a substrate-based device according to another embodiment.
Figure 8:
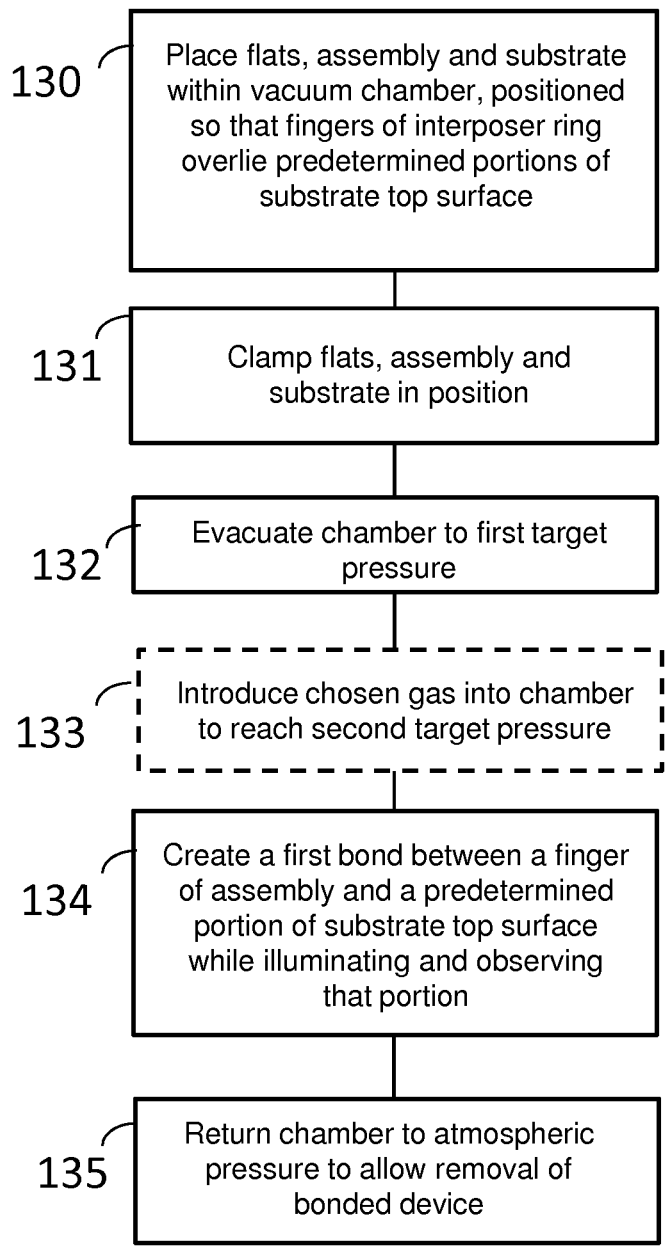
FIG. 8 is a flowchart of process steps for attaching a ring-cap assembly to a substrate-based device according to the embodiment of FIG. 7.

FIGS. 7 and 8 illustrate other embodiments of the claimed method which allow the environment, in which bonding occurs, to be controlled with respect to both pressure and gaseous composition. Such control reduces contamination, resulting in improved yield of high quality bonds.

FIG. 7 shows a vacuum chamber 120 housing the ring-cap assembly and the substrate of the embodiment of FIG. 1, prior to the creation of any bond between a finger of the ring-cap assembly and the top surface of the substrate. Port 122 may be coupled to a system including a vacuum pump to allow the evacuation of chamber 120 to a target pressure. A typical value of this pressure is $10^{-6}$ torr, but other values higher or lower than this may be appropriate. Port 124 may be coupled to a source of gas to allow the chamber to be filled with a gas of known, fixed composition. This gas may be a single molecular species such as Argon, or may comprise a mixture of gases, with the mixture optionally including an inert gas such as Nitrogen or Argon. The ring-cap assembly 18 and substrate 11 are held between flats 126 and 128 and clamped together in the position required for the desired bond. Flat 126 may be shaped and sized to directly contact only cap 10, avoiding contact with the top surface of ring 17 to facilitate optical illumination and viewing access to the peripheral regions of that ring. Some details of the features of the ring previously described are omitted from FIG. 7 for simplicity.

FIG. 8 illustrates the process steps that accomplish bonding in a controlled environment of the type shown in FIG. 7. At step 130, flats 126 and 128 and ring-cap assembly 18 are placed within a chamber 120 and positioned so that the plurality of fingers 20 underlying a projecting peripheral portion of the ring overlies predetermined portions 22 of the substrate top surface 23. At step 131, the flats, rig cap assembly and substrate are clamped together to maintain the chosen position. At step 132, the chamber is evacuated to a first target pressure. An optional step 133 allows the inflow of a chosen gas to a second target pressure. At step 134, a first bond 26 is created between a first one of the plurality of fingers and a corresponding first predetermined portion of the substrate top surface. This bonding is carried out under illumination and observation as previously described with respect to other embodiments to determine a quality measure of the first bond. At step 135, the chamber is brought to atmospheric pressure allowing the bonded device to be removed.

Other elements, such as optical elements required to illuminate and observe the bond, or elements required to perform room temperature laser bonding in particular embodiments, may be positioned inside or outside the vacuum chamber as appropriate in particular circumstances.

The use of a vacuum chamber and optional gas source to control the pressure and gaseous composition of the environment in which bonding occurs may be implemented with the sequential multi-device bonding embodiments described earlier.

The above-described embodiments should be considered as examples of the present invention, rather than as limiting the scope of the invention. Various modifications of the above-described embodiments of the present invention will become apparent to those skilled in the art from the foregoing description and accompanying drawings. Accordingly, the present invention is to be limited solely by the scope of the following claims.

The invention claimed is:

1. A method for bonding a cap to a substrate, the method comprising:
   providing a ring-cap assembly comprising:
      the cap having a cap top surface, a cap bottom surface and being characterized by a cap width; and
      an interposer ring comprising a ring material transparent at an illumination wavelength, the ring having a ring top surface, a ring bottom surface, and being characterized by a ring width greater than the cap width, wherein the ring top surface is attached to the cap bottom surface to form the ring-cap assembly such that a peripheral portion of the ring projects outwards beyond the overlying cap, and wherein the portion of the ring bottom surface underlying the projecting peripheral portion of the ring comprises a plurality of downwardly extending fingers;
   providing the substrate having a substrate top surface;
   positioning the ring-cap assembly so that the plurality of fingers overlies predetermined portions of the substrate top surface; and
   creating a first bond between a first one of the plurality of fingers and a corresponding first predetermined portion of the substrate top surface while illuminating and observing the first predetermined portion at the illumination wavelength through the projecting peripheral portion of the ring to determine a quality measure of the first bond.

2. The method of claim 1 further comprising:
if the determined quality measure of the first bond falls below a desired threshold, creating a second bond between a second one of the plurality of fingers and a corresponding second predetermined portion of the substrate top surface while illuminating and observing the second predetermined portion at the illumination wavelength through the projecting peripheral portion of the ring to determine a quality measure of the second bond.

3. The method of claim 1 wherein the observing comprises viewing an optical interference pattern.

4. The method of claim 1 wherein the cap comprises a cap material opaque at the chosen illumination wavelength.

5. The method of claim 1 wherein the ring material is transparent at a chosen range of illumination wavelengths, and wherein creating a first bond between a first one of the plurality of fingers and a corresponding first predetermined portion of the substrate top surface is carried out while illuminating and observing the first predetermined portion at the chosen range of illumination wavelengths through the projecting peripheral portion of the ring to determine a quality measure of the first bond.

6. The method of claim 1 wherein the ring material comprises glass.

7. The method of claim 1 wherein creating a first bond comprises room temperature laser bonding.

8. The method of claim 7 wherein the laser bonding comprises irradiating the first predetermined portion of the substrate surface with a laser beam that reaches the first predetermined portion of the substrate top surface after passing through the interposer ring.

9. The method of claim 7 wherein the laser bonding comprises irradiating the first predetermined portion of the substrate surface with a laser beam that reaches the first predetermined portion of the substrate top surface after passing through the substrate.

10. The method of claim 1 wherein a blocking absorption coating is deposited on either the predetermined portions of the substrate top surface, or the fingers of the interposer ring, or on the predetermined portions of the substrate top surface and the fingers of the interposer ring, prior to the steps of positioning the ring-cap assembly and creating a first bond.

11. The method of claim 1 further comprising:
prior to the step of positioning the ring-cap assembly so that the plurality of fingers overlies predetermined portions of the substrate top surface, positioning the ring-cap assembly and the substrate within a vacuum chamber;
subsequent to the step of positioning the ring-cap assembly so that the plurality of fingers overlies predetermined portions of the substrate top surface, and prior to the step of creating the first bond, clamping the ring-cap assembly and the substrate together and evacuating the vacuum chamber to a first predetermined pressure; and
subsequent to the step of creating the first bond, restoring the vacuum chamber to atmospheric pressure.

12. The method of claim 11 further comprising:
subsequent to the step of clamping the ring-cap assembly and the substrate together and evacuating the chamber to a first predetermined pressure; filling the vacuum chamber with a predetermined gas to reach a second predetermined pressure.

13. The method of claim 12 wherein the predetermined gas comprises an inert gas.

14. A method for bonding a plurality of caps to a substrate, the method comprising:
providing a plurality of ring-cap assemblies, each ring-cap assembly comprising:
one of the plurality of caps, each cap having a cap top surface, a cap bottom surface and being characterized by a cap width; and
an interposer ring comprising a ring material transparent at an illumination wavelength, the ring having a ring top surface, a ring bottom surface, and being characterized by a ring width greater than the cap width, wherein the ring top surface is attached to the cap bottom surface to form the ring-cap assembly such that a peripheral portion of the ring projects outwards beyond the overlying cap, and wherein the portion of the ring bottom surface underlying the projecting peripheral portion of the ring comprises a plurality of downwardly extending fingers;
providing the substrate having a substrate top surface; and
for each of said plurality of ring-cap assemblies, carrying out the following steps in turn:
first, positioning the assembly so that the plurality of fingers of the first assembly overlies predetermined portions of the substrate top surface; and
second, creating a first bond between a first one of the plurality of fingers of the assembly and a corresponding first predetermined portion of the substrate top surface while illuminating and observing the first predetermined portion at the illumination wavelength through the projecting peripheral portion of the ring to determine a quality measure of the first bond.

15. The method of claim 14 further comprising, for each of said plurality of ring cap assemblies, carrying out a third step following the first positioning step and the second creating step, the third step comprising:
if the determined quality measure of the first bond falls below a desired threshold, creating a second bond between a second one of the plurality of fingers and a corresponding second predetermined portion of the substrate top surface while illuminating and observing the second predetermined portion at the illumination wavelength through the projecting peripheral portion of the ring to determine a quality measure of the second bond.

16. A method for bonding a plurality of caps to a substrate, the method comprising:
providing a plurality of ring-cap assemblies, each ring-cap assembly comprising:
one of the plurality of caps, each cap having a cap top surface, a cap bottom surface and being characterized by a cap width; and
an interposer ring comprising a ring material transparent at an illumination wavelength, the ring having a ring top surface, a ring bottom surface, and being characterized by a ring width greater than the cap width, wherein the ring top surface is attached to the cap bottom surface to form the ring-cap assembly such that a peripheral portion of the ring projects outwards beyond the overlying cap, and wherein the portion of the ring bottom surface underlying the projecting peripheral portion of the ring comprises a plurality of downwardly extending fingers;
providing the substrate having a substrate top surface;
positioning the plurality of assemblies so that the plurality of fingers of each assembly overlies predetermined portions of the substrate top surface; and creating a plurality of first bonds at substantially the same time, each of said first bonds corresponding to a separate one of said plurality of assemblies, wherein each of said first bonds is created between a first one of the plurality of fingers of an assembly and a corresponding first predetermined portion of the substrate top surface while illuminating and observing the first predetermined portion at the illumination wavelength through the projecting peripheral portion of the corresponding ring to determine a quality measure of the corresponding first bond.

17. The method of claim 16, further comprising:

prior to the step of positioning the plurality of assemblies so that the plurality of fingers of each assembly overlies predetermined portions of the substrate top surface, positioning the plurality of assemblies and the substrate within a vacuum chamber;

subsequent to the step of positioning the plurality of ring-cap assemblies so that the plurality of fingers of each assembly overlies predetermined portions of the substrate top surface, and prior to the step of creating the plurality of first bonds, clamping the ring-cap assemblies and the substrate together and evacuating the vacuum chamber to a first predetermined pressure; and subsequent to the step of creating the plurality of first bonds, restoring the vacuum chamber to atmospheric pressure.

18. The method of claim 17, further comprising:

subsequent to the step of clamping the ring-cap assemblies and the substrate together and evacuating the chamber to a first predetermined pressure; filling the vacuum chamber with a predetermined gas to reach a second predetermined pressure.

19. The method of claim 18 wherein the predetermined gas comprises an inert gas.

* * * * *